US009445400B2

(12) United States Patent
Agiwal et al.

(10) Patent No.: US 9,445,400 B2
(45) Date of Patent: Sep. 13, 2016

(54) METHODS AND DEVICES FOR PERFORMING AN AUTOMATIC REPEAT REQUEST RESET IN A WIRELESS COMMUNICATION ENVIRONMENT

(75) Inventors: Anil Agiwal, Banglore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 13/807,986

(22) PCT Filed: Jul. 1, 2011

(86) PCT No.: PCT/KR2011/004867
§ 371 (c)(1),
(2), (4) Date: Jan. 2, 2013

(87) PCT Pub. No.: WO2012/002778
PCT Pub. Date: Jan. 5, 2012

(65) Prior Publication Data
US 2013/0107850 A1 May 2, 2013

(30) Foreign Application Priority Data

Jul. 2, 2010 (IN) .......................... 1894/CHE/2010

(51) Int. Cl.
*H04W 72/04* (2009.01)
*H04L 1/18* (2006.01)

(52) U.S. Cl.
CPC ........ *H04W 72/0406* (2013.01); *H04L 1/1835* (2013.01); *H04L 1/1864* (2013.01); *H04L 1/1874* (2013.01); *H04L 1/1887* (2013.01); *H04L 1/1896* (2013.01)

(58) Field of Classification Search
CPC ..... H04L 1/18; H04L 1/1806; H04L 1/1822; H04L 1/1825

USPC ......................................................... 370/329
See application file for complete search history.

(56) References Cited

U.S. PATENT DOCUMENTS 7,676,721 B2 3/2010 Kim
2006/0148478 A1 7/2006 Jeong et al.
(Continued)

FOREIGN PATENT DOCUMENTS

CN 101631009 A 1/2010
JP 2007228377 A 9/2007
(Continued)

OTHER PUBLICATIONS

AAI ARQ Reset message modification (16.2.3.44), IEEE 802.16m-10/0682r2, pp. 1-2, May 11, 2010.
(Continued)

*Primary Examiner* — Dang Ton
*Assistant Examiner* — Kevin Lee
(74) *Attorney, Agent, or Firm* — Jefferson IP Law, LLP

(57) ABSTRACT

A method and device for performing an Automatic Repeat Request (ARQ) procedure in a wireless communication environment are provided. An initiation of the ARQ reset procedure is triggered by one of a transmitting device and a receiving device. A sequence number corresponding to a start of an ARQ window is determined. The sequence number is a sequence number of a first ARQ block to be transmitted by the transmitting device upon completion of the ARQ reset procedure. An ARQ reset message indicating the determined sequence number is transmitted to the receiving device. Accordingly, first and second pointer values of the ARQ window at the receiving device is set to the sequence number in the ARQ reset message. An ARQ reset acknowledgement message is sent to the transmitting device. Moreover, first and second pointer values of the ARQ window at the transmitting device is set to the determined sequence number.

36 Claims, 8 Drawing Sheets

(56) References Cited

U.S. PATENT DOCUMENTS

2008/0195911 A1  8/2008  Schaap et al.
2009/0228754 A1  9/2009  Roy et al.

FOREIGN PATENT DOCUMENTS

JP  2009232084 A  10/2009
KR  10-2009-0094948 A  9/2009

OTHER PUBLICATIONS

Ericsson, 'RLC Window Operation', 3GPP TSG-RAN WG2 #60, R2-074702, Nov. 5, 2012, pp. 1-6.

'AAI_ARQ-Reset Message modification (16.2.3.44)', IEEE C802.16m-10/0682r1, Apr. 30, 2010, pp. 1-2.

METHODS AND DEVICES FOR PERFORMING AN AUTOMATIC REPEAT REQUEST RESET IN A WIRELESS COMMUNICATION ENVIRONMENT

PRIORITY

This application is a National Stage application under 35 U.S.C. §371 of an International application filed on Jul. 1, 2011 and assigned application No. PCT/KR2011/004867, and claims the benefit under 35 U.S.C. §365(b) of an Indian patent application filed on Jul. 2, 2010 in the India Intellectual Property Office and assigned Serial No. 1894/CHE/2010, the entire disclosure of which is hereby incorporated by reference.

BACKGROUND OF THE INVENTION

1. Field of the Invention

The present invention relates to the field of wireless communication devices. More particularly the present invention relates to performing an Automatic Repeat Request (ARQ) reset procedure in a wireless communication environment.

2. Description of the Related Art

Broadband wireless networks based on various standards (e.g., the Institute of Electronic and Electric Engineers (IEEE) 802.16 based WiMAX standard and its evolution to IEEE 802.16m) provide various types of services such as voice, packet data and so on. In order to provide these kinds of services, control information and data packets are exchanged between a Mobile Station (MS) and a Base Station (BS). The control information is generated by various protocols at the mobile station and the base station, while the data packets are generated by various applications at the mobile station and base stations.

Typically, the wireless communication standards (e.g., $3^{rd}$ Generation Partnership Project (3GPP) Long Term Evolution (LTE), IEEE 802.20, and IEEE 802.16e-2005) use an Automatic Repeat Request (ARQ) protocol at a Medium Access Control (MAC) layer for reliably in transmitting data packets between the mobile station and the base station. In normal ARQ operation, a transmitting device (e.g., a mobile station or a base station) sends one or more ARQ blocks to a receiving device (e.g., the base station or the mobile station) and waits for an acknowledgment from the receiving device. It is understood that, each of the one or more ARQ blocks is assigned a sequence number. If the receiving device receives the ARQ block successfully, the receiving device sends a positive acknowledgement to the transmitting device. If the receiving device detects that one or more ARQ blocks are missed, then the receiving device sends a negative acknowledgment to the transmitting device. Accordingly, the transmitting device updates an ARQ window based on the ARQ feedback received from the receiving device. Similarly, the receiving device updates an ARQ window which is updated based on the received ARQ blocks.

Typically, at the transmitting device, the ARQ window consists of two pointers. The first pointer (e.g., ARQ TX WINDOW START) is a start of the window and points to the ARQ block with a lowest sequence number which has been transmitted by the transmitting device and not yet positively acknowledged by the receiving device. The second pointer (e.g., ARQ TX NEXT BSN) is a sequence number of the ARQ block which is to be transmitted next by the transmitting device. This value shall reside in the interval ARQ_TX_WINDOW_START to (ARQ_TX_WINDOW_START+ARQ_WINDOW_SIZE), inclusive.

At the receiving device, the ARQ window also consists of two pointers. The first pointer (e.g., ARQ RX WINDOW START) is the start of window that points to the ARQ block with lowest sequence number (not correctly received by the receiving device). The second pointer (e.g., ARQ RX NEXT BSN) is a highest sequence number of the highest ARQ block that is received by the receiving device plus one. This value shall reside in the interval ARQ_RX_WINDOW_START to (ARQ_RX_WINDOW_START+ARQ_WINDOW_SIZE), all inclusive. For reliable transmission of ARQ blocks, it is desirable that the ARQ windows at the transmitting device and the receiving device are in sync. For example, synchronization between the ARQ windows at the transmitting device and the receiving device is lost when there is an error in the wireless channel.

When the synchronization is lost, an ARQ reset procedure is initiated by an ARQ entity of the transmitting device or the receiving device. In case the ARQ reset procedure is initiated at the transmitting device, the ARQ entity disables the transmission of new ARQ blocks and retransmission of negatively acknowledged ARQ blocks. Then, the ARQ entity transmits an ARQ reset message to the ARQ entity at the receiving device and waits for an ARQ reset message from the ARQ entity at the receiving device. Based on the ARQ reset message, the ARQ entity at the receiving device disables the ARQ block reception and sets the first pointer (e.g., ARQ_RX_WINDOW_START) to 0, sets the second pointer (e.g., ARQ RX NEXT BSN) to 0, discards all incomplete MAC Service Data Units (SDUs) received in the ARQ blocks and enables the ARQ block reception. Then, the ARQ entity at the receiving device transmits an ARQ reset message to the ARQ entity at the transmitting device. Accordingly, the ARQ entity at the transmitting device sets the first pointer (e.g., ARQ_TX_WINDOW_START) to 0, sets the second pointer (e.g., ARQ TX NEXT BSN) to 0, discards the ARQ blocks which are in the discarded state and then enables the transmission of the ARQ blocks. It is understood that the ARQ blocks are said to be in the discarded state when the acknowledgement is not received for an ARQ block within an ARQ block life time. A similar ARQ reset procedure is performed when the ARQ reset procedure is initiated by the ARQ entity of the receiving device, except the ARQ entity at the receiving device sends an ARQ repeat request to the transmitting device's ARQ entity.

In the current ARQ reset procedure, the ARQ entity at the transmitting device disables transmission of new ARQ blocks and also the ARQ blocks which are negatively acknowledged and then sends the ARQ reset message to the ARQ entity at the receiving device. At the time of transmission of the ARQ reset message, no new Hybrid Automatic Repeat reQuest (HARQ) process carrying a MAC layer packet with new ARQ blocks is initiated. However, there may be HARQ processes which are active and transmitting the ARQ blocks generated before disabling transmission of new ARQ blocks. It can be noted that the HARQ process carrying the MAC layer packet with the ARQ reset message may be completed before completion of the HARQ processes carrying the ARQ blocks. Consequently, the ARQ entity at the receiving device may receive the ARQ reset message earlier than the ARQ blocks generated prior to transmission of the ARQ reset message by the transmitting device.

Basically, HARQ is used at the physical layer to transmit a MAC layer packet with ARQ blocks. The MAC layer packet consists of MAC Packet Data Units (PDUs) including ARQ blocks. In HARQ, multiple HARQ processes (each HARQ process carrying a MAC layer packet) are active simultaneously. It is understood that, the MAC layer packets transmitted by the transmitting device are received out of order due to multiple HARQ processes, each trying different re-transmission attempts due to varying channel conditions.

Since, the MAC layer packets carried in the HARQ process consists of multiple MAC PDUs belonging to different connections, the transmitting device may not be able to terminate the ongoing HARQ transmissions when the ARQ reset message is transmitted. In other words, if the transmitting device terminates the ongoing HARQ transmissions, data corresponding to other connections may be lost.

Alternatively, HARQ reordering can be performed at the receiving device prior to processing the MAC PDUs in the MAC layer packets. However, the HARQ reordering may deteriorate Quality of Service (QoS) if performed across connections as MAC PDUs of one connection are delayed due to MAC PDUs of other connections.

SUMMARY OF THE INVENTION

Aspects of the present invention are to address at least the above-mentioned problems and/or disadvantages and to provide at least the advantages described below. Accordingly, an aspect of the present invention is to provide the limitations of the above described related-art Automatic Repeat Request (ARQ) reset procedure is explained below by way of various exemplary embodiments.

1) Data Loss: A large number of ARQ blocks transmitted by the transmitting device after the completion of an ARQ reset procedure may be discarded as duplicates. Consider a system with an ARQ window of size 512. Also consider that, ARQ blocks starting from Sequence Number (SN) 300 are in transmission when the ARQ reset procedure is initiated.

Suppose, the ARQ block with SN 300 is received by the receiving device after the ARQ window is reset. On receiving the ARQ block with SN 300, the receiving device starts a purge timer and awaits reception of the ARQ blocks with SN 0 to 299. Typically, the purge timer value is configured considering the number of ARQ retransmissions for an ARQ block. The above scenario has aroused due receipt of the ARQ block on one end of the ARQ window. Thus, when the purge timer expires, the transmitting device may have transmitted new ARQ blocks after initiating the ARQ reset, but not all ARQ blocks which the receiving device is expecting. For the purpose of illustration, consider that 200 ARQ blocks are transmitted by the transmitting device after initiating the ARQ reset and before expiry of the purge timer. Also, consider that all 200 ARQ blocks are received by the receiving device.

After expiry of the purge timer, the ARQ window at the receiving device starts at SN 301, whereas the ARQ window in the transmitting device starts at SN 200. As a result, when the transmitting device transmits ARQ blocks staring with SN 200, all the ARQ blocks from SN 200 to 300 are discarded as duplicates leading to data loss and a lot of retransmission at an upper layer (e.g., the Transmission Control Protocol (TCP) layer).

2) Unreliable delivery (i.e., incorrect data reception by the application): Consider that the transmitting device has transmitted ARQ blocks with SN 0 to 3 and a first pointer (e.g., ARQ_TX_WINDOW_START) points at SN 0 and a second pointer (e.g., ARQ_TX_NEXT_SN) points at SN 4. Medium Access Control (MAC) Service Data Unit (SDU) 1 is transmitted in an ARQ block with SN 0. MAC SDU 2 is transmitted in an ARQ block with SN 1. The first fragment of MAC SDU 3 is transmitted in an ARQ block with SN 2. The last fragment of MAC SDU 3 is transmitted in an ARQ block with SN 3. When the ARQ reset procedure is initiated, the ARQ block with SN 3 is in transmission. This ARQ block is received by the receiving device after the ARQ reset procedure. After completion of the ARQ reset procedure, the transmitting device transmits the MAC SDUs again in ARQ blocks starting with SN=0.

Now consider that the ARQ block with SN 0 carries MAC SDU 1. The ARQ block with SN 1 carries MAC SDU 2 and MAC SDU 3. The ARQ block with SN 2 carries a first fragment of MAC SDU 4 and the ARQ block with SN 3 carries a last fragment of the MAC SDU 4. When the receiving device receives an ARQ block with SN 3, the ARQ block is discarded as duplicate as the ARQ receiver has received an ARQ block with SN 3. The receiving device then combines ARQ block with SN 2 and SN 3 to form a MAC SDU and sends this to the upper layer. But, the MAC SDU is an incorrect one since it consists of a first half from SDU 4 and second half from SDU 3.

According to another aspect of the present invention, a method and system for performing an ARQ reset in a wireless communication environment are provided. In the following detailed description of the exemplary embodiments of the invention, reference is made to the accompanying drawings that form a part hereof, and in which are shown by way of illustration specific exemplary embodiments in which the invention may be practiced. These exemplary embodiments are described in sufficient detail to enable those skilled in the art to practice the invention, and it is to be understood that other exemplary embodiments may be utilized and that changes may be made without departing from the scope of the present invention. The following detailed description is, therefore, not to be taken in a limiting sense, and the scope of the present invention is defined only by the appended claims.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
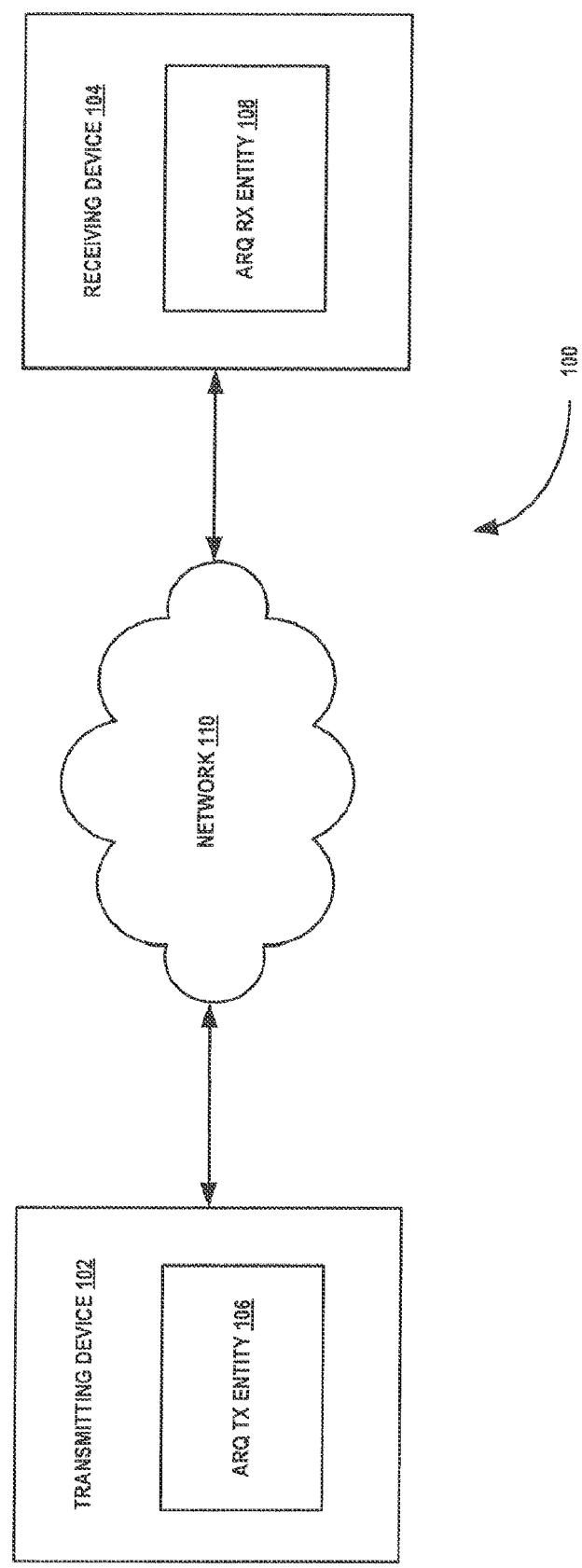
FIG. 1 is a block diagram of a wireless communication system for performing an Automatic Repeat Request (ARQ) reset procedure, according to an exemplary embodiment of the present invention.

FIG. 1 illustrates a block diagram of a wireless communication system for performing an Automatic Repeat Request (ARQ) reset procedure, according to an exemplary embodiment of the present invention.

Referring to FIG. 1, a wireless communication system 100 includes a transmitting device 102 with an ARQ Transmission (TX) entity 106, a receiving device 104 with an ARQ Reception (RX) entity 108, and a network 110. For example, the transmitting device 102 may be a base station or user equipment. Also, the receiving device 104 may be user equipment or a base station.

In an exemplary embodiment, consider that the ARQ TX entity 106 initiates an ARQ reset procedure for synchronizing ARQ windows associated with the transmitting device 102 and the receiving device 104. It is appreciated that, the ARQ RX entity 108 may also initiate the ARQ reset procedure. The ARQ TX entity 106 determines a Sequence Number (SN) corresponding to a start of an ARQ window upon initiation of the ARQ reset procedure. The determined sequence number is the sequence number of the first ARQ block to be transmitted by the transmitting device 102 upon completion of the ARQ reset procedure.

The ARQ TX entity 106 transmits an ARQ reset message indicating the determined sequence number of the ARQ block to the receiving device 104. Accordingly, the ARQ RX entity 108 sets a first pointer (e.g., ARQ_RX_WINDOW_START_SN) value and a second pointer (e.g., ARQ_RX_NEXT_SN) value of an ARQ window at the receiving device 104 to the sequence number indicated in the ARQ reset message received from the transmitting device 102. The ARQ RX entity 108 then sends an ARQ reset acknowledgement message to the transmitting device 102. Upon receipt of the ARQ reset acknowledgement message, the ARQ TX entity 106 sets a first pointer (e.g., ARQ_TX_WINDOW_START_SN) value and a second pointer (e.g., ARQ_TX_NEXT_SN) value of an ARQ window at the transmitting device 102 to the determined sequence number (i.e., the sequence number indicated in the ARQ reset message transmitted by the ARQ TX entity 106). Thus, in the manner described above, the ARQ reset procedure is completed. Therefore, the transmitting device 102 and the receiving device 104, upon completion of the ARQ reset procedure, starts their ARQ windows from a sequence number determined by the ARQ TX entity 106 irrespective of whether the ARQ reset procedure is initiated by the transmitting device 102 or the receiving device 104. Moreover, the ARQ reset procedure according to one or more exemplary embodiments of the present invention is explained in greater detail below with respect to FIGS. 2-5.

Figure 2:
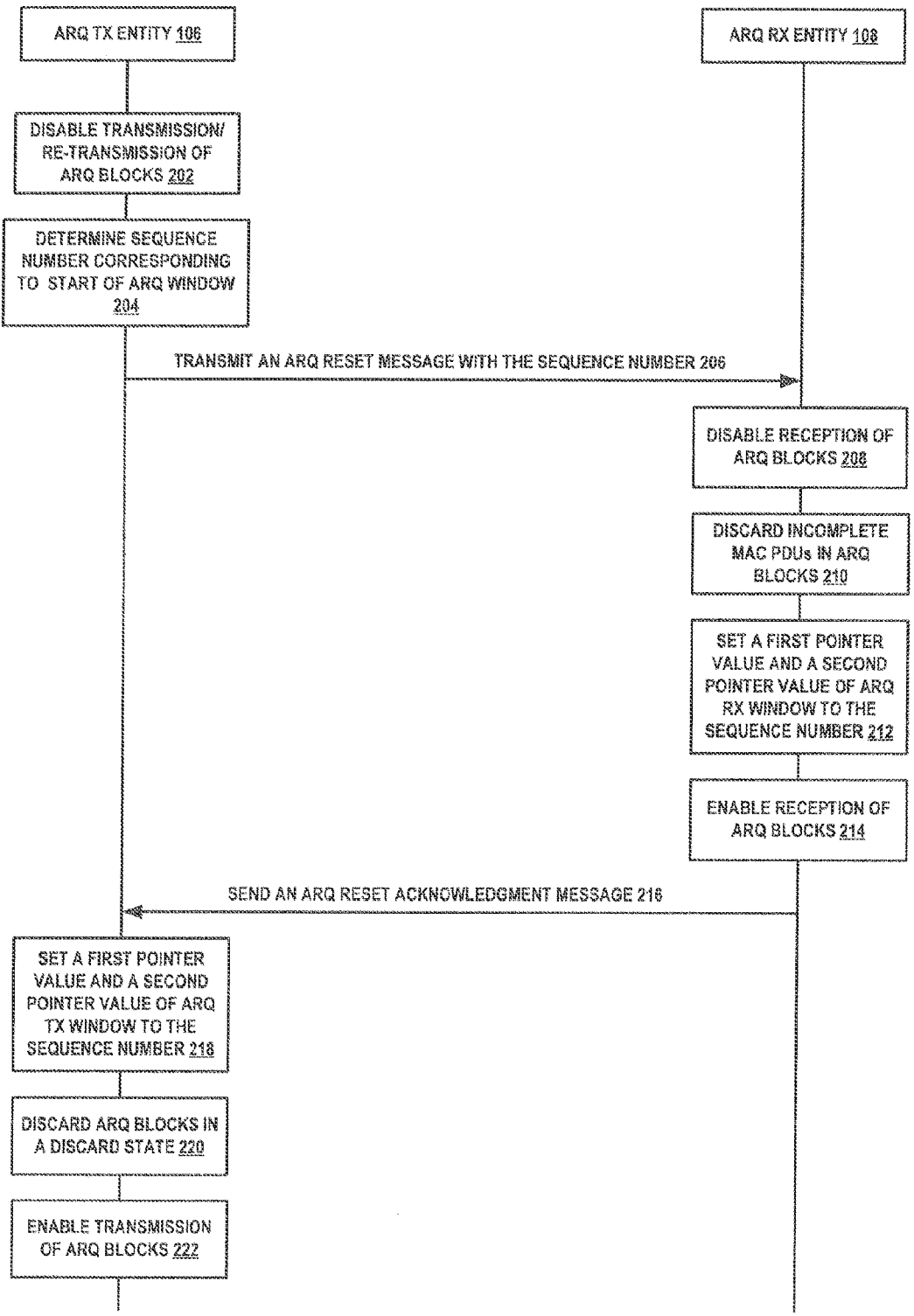
FIG. 2 is a flow diagram illustrating an exemplary method of performing an ARQ reset procedure in a wireless communication environment, according to an exemplary embodiment of the present invention.

FIG. 2 is a flow diagram illustrating an exemplary method of performing an ARQ reset procedure in a wireless communication environment, according to an exemplary embodiment of the present invention.

Referring to FIG. 2, at step 202, the ARQ TX entity 106 disables transmission of new ARQ blocks and re-transmission of previously transmitted ARQ blocks upon initiation of the ARQ reset procedure. The steps 202-222 in FIG. 2 illustrate an ARQ reset procedure performed between the ARQ TX entity 106 of the transmitting device 102 and the ARQ RX entity 108 of the receiving device 104 when the ARQ reset procedure is initiated by the transmitting device 102.

At step 204, the ARQ TX entity 106 determines a sequence number corresponding to a start of an ARQ window when the initiation of the ARQ reset procedure is triggered. According to an exemplary embodiment, the ARQ windows in the transmitting device 102 and the receiving device 104 starts from the determined sequence number upon the completion of the ARQ reset procedure. In one exemplary embodiment, the determined sequence number corresponds to a sequence number of a first ARQ block to be transmitted by the transmitting device 102 upon completion of the ARQ reset procedure. It can be noted that, the step 204 can be performed substantially simultaneously along with the step 202.

In one exemplary embodiment, the sequence number is determined based on a first pointer value (e.g., ARQ_TX_WINDOW_START_SN) of an ARQ window at the transmitting device 102 when the initiation of ARQ reset procedure is triggered. In one exemplary implementation, the sequence number (e.g., ARQ_WINDOW_START_SNARQ_RESET) corresponding to the start of an ARQ window is determined based on following:

ARQ_WINDOW_START_SNARQ_RESET=(ARQ_TX_WINDOW_START_SN+ARQ_WINDOW_SIZE)mod(ARQ_SN_MODULUS), where, ARQ_WINDOW_START_SNARQ_RESET is a sequence number to be determined, ARQ_TX_WINDOW_

START_SN is a starting sequence of the ARQ window at the transmitting device 102 at the time initiation of the ARQ reset procedure is triggered, and ARQ_SN_MODULUS is a number of unique sequence number values. In an example, consider a system with sequence number=10 bits, and ARQ_WINDOW_SIZE=512. If the ARQ_TX_WINDOW_START_SN=0, then ARQ_WINDOW_START_SNARQ_RESET=(0+512) mod(1024)=512. It can be noted that, upon completion of the ARQ reset procedure, the transmitting device 102 will transmit new ARQ blocks starting with sequence number=512. In other words, the first ARQ block that the receiving device 104 is expecting to receive upon completion of the ARQ reset procedure is an ARQ block with sequence number 512.

In an alternate exemplary embodiment, the sequence number is determined based on a second pointer value (e.g., ARQ_TX_NEXT_SN) of an ARQ window at the transmitting device 102 at the time initiation of ARQ reset procedure is triggered. In one exemplary embodiment, the sequence number (e.g., ARQ_WINDOW_START_SNARQ_RESET) corresponding to the start of ARQ window is determined based on following:

ARQ_WINDOW_START_SNARQ_RESET=(ARQ_TX_NEXT_SN+ARQ_WINDOW_SIZE)mod(ARQ_SN_MODULUS), where ARQ_TX_NEXT_SN is one greater than the sequence number of latest transmitted new ARQ block.

At step 206, the ARQ TX entity 106 transmits an ARQ reset message with the determined sequence number. The ARQ reset message indicates to the ARQ RX entity 108 that the ARQ reset procedure is initiated. Upon receiving the ARQ reset message, the ARQ RX entity 108 disables reception of ARQ blocks from the transmitting device 102, at step 208. At step 210, the ARQ RX entity 108 discards incomplete Medium Access Control (MAC) Packet Data Units (PDUs) in the ARQ blocks upon receiving the ARQ reset message.

At step 212, the ARQ RX entity 108 sets a first pointer value (e.g., ARQ_RX_WINDOW_START_SN) and a second pointer value (e.g., ARQ_RX_NEXT_SN) of an ARQ window at the receiving device 104 to the sequence number (e.g., ARQ_WINDOW_START_SNARQ_RESET) indicated in the ARQ reset message. At step 214, the ARQ RX entity 108 enables reception of ARQ blocks from the transmitting device 102. At step 216, the ARQ RX entity 108 sends an ARQ reset acknowledgement message acknowledging the reception of the ARQ reset message.

At step 218, the ARQ TX entity 106 sets a first pointer value (e.g., ARQ_TX_WINDOW_START_SN) and a second pointer value (e.g., ARQ_RX_NEXT_SN) of an ARQ window at the transmitting device 104 to the determined sequence number (e.g., ARQ_WINDOW_START_SNARQ_RESET). At step 220, the ARQ TX entity 106 discards ARQ blocks in discarded state upon setting the first and second pointer values in the ARQ window. At step 222, the ARQ TX entity 106 enables transmission of ARQ blocks to the receiving device 104.

Figure 3:
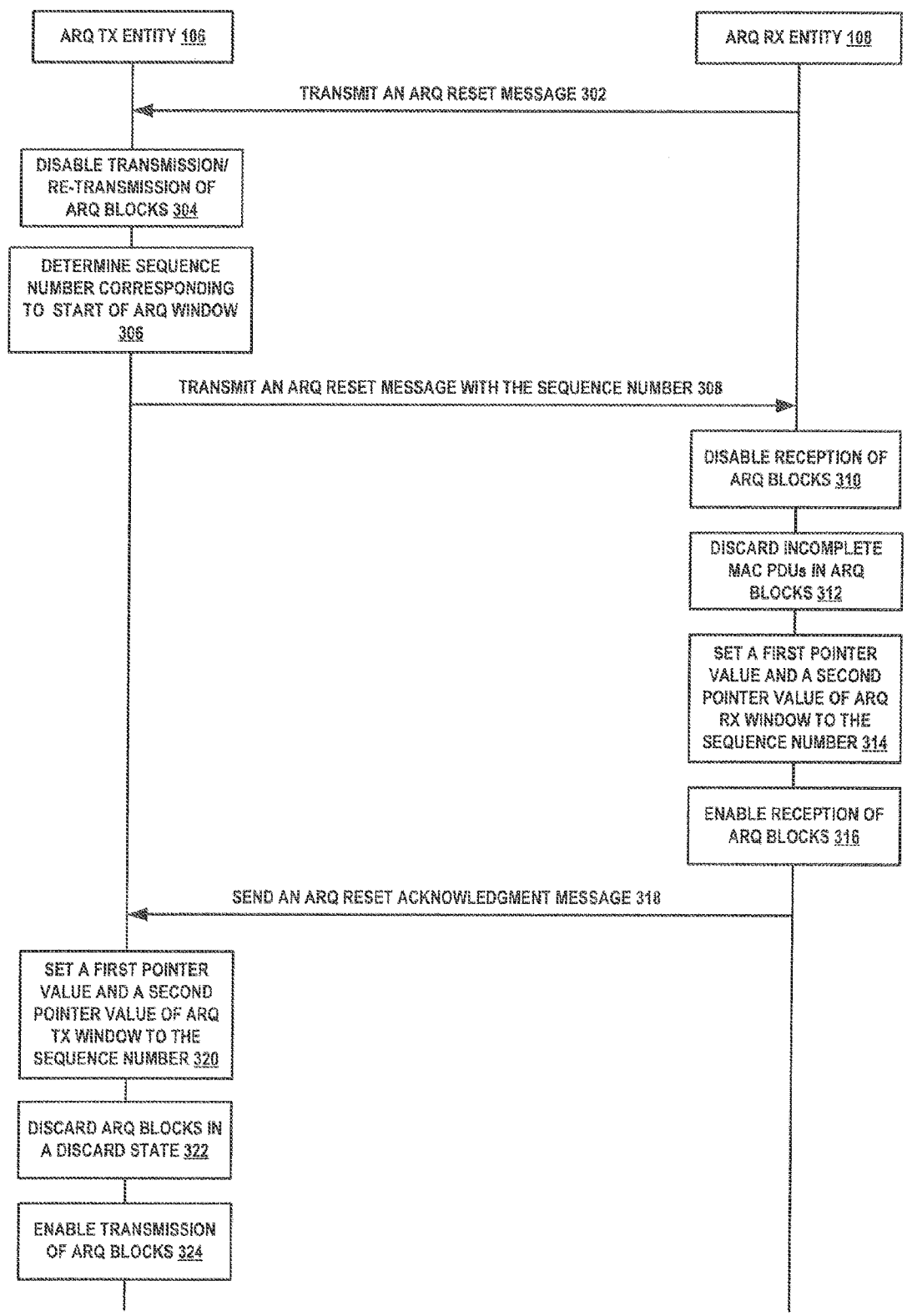
FIG. 3 is a flow diagram illustrating an exemplary method of performing an ARQ reset procedure in a wireless communication environment, according to an exemplary embodiment of the present invention.

FIG. 3 is a flow diagram illustrating an exemplary method of performing an ARQ reset procedure in a wireless communication environment, according to another exemplary embodiment of the present invention.

Referring to FIG. 3, the ARQ RX entity 108 sends an ARQ reset message indicating initiation of an ARQ reset procedure to the transmitting device 102, at step 302. It can be seen from FIG. 3 that the steps 304-324 are similar to the steps 202-222 described above and hence an explanation of steps 304-324 is omitted herein for brevity.

Figure 4:
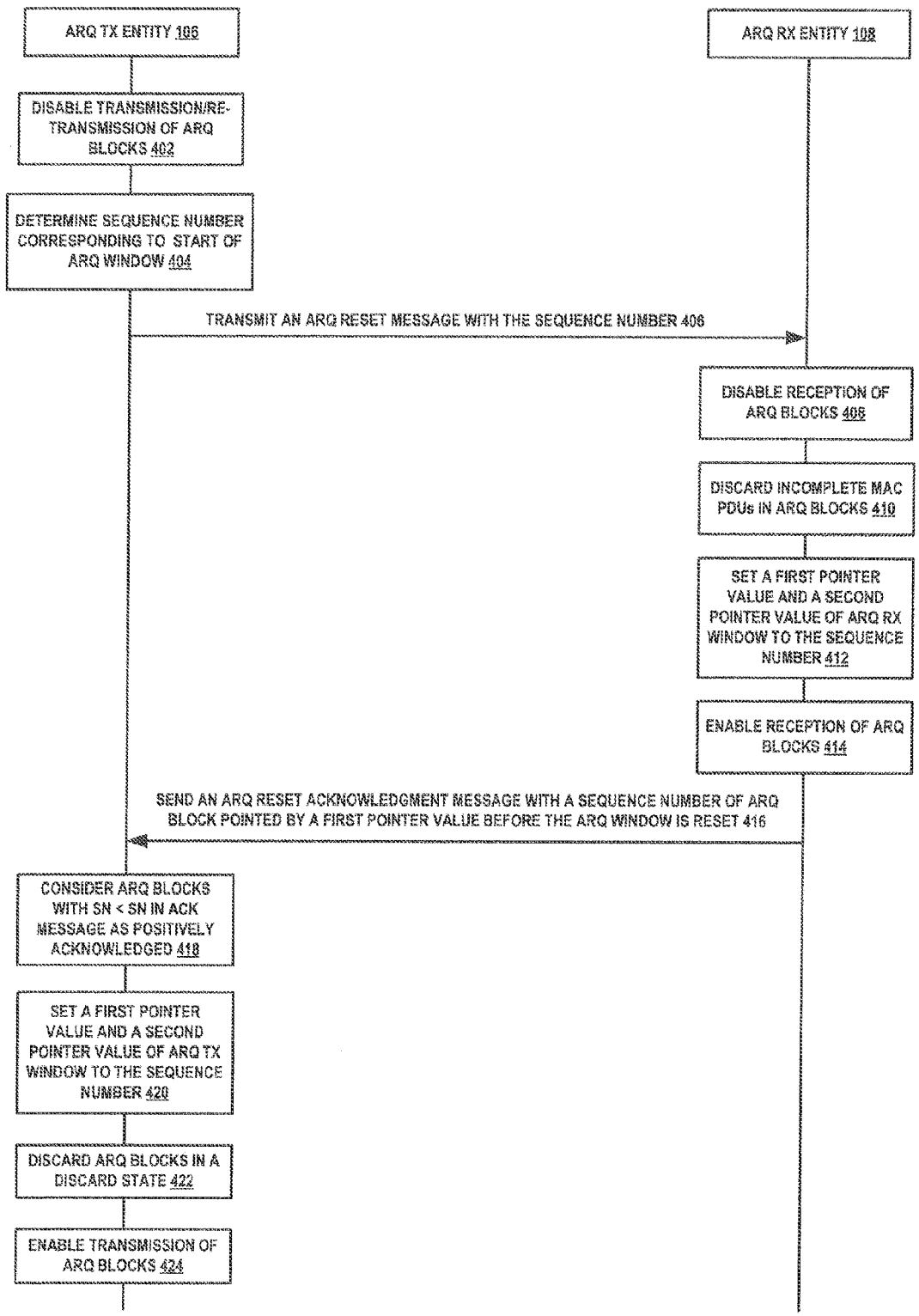
FIG. 4 is a flow diagram illustrating an exemplary method of performing an ARQ reset procedure in a wireless communication environment, according to yet another exemplary embodiment of the present invention.

FIG. 4 is a flow diagram illustrating an exemplary method of performing an ARQ reset procedure in a wireless communication environment, according to yet another exemplary embodiment of the present invention.

Referring to FIG. 4, an exemplary method is shown of performing ARQ reset when initiated by the transmitting device 102 and hence the procedure is similar to the ARQ reset procedure illustrated in FIG. 2, except for steps 416 and 418. Accordingly, a description of steps other than steps 416 and 418 is omitted herein for brevity.

At step 416, the ARQ RX entity 108 sends an ARQ reset acknowledgement message to the ARQ TX entity 106 indicating a sequence number of an ARQ block pointed by a first pointer value of the ARQ window at the receiving device 104 prior to resetting the ARQ window (i.e., prior to setting the first pointer value and the second pointer value of the ARQ window to the sequence number received in the ARQ reset message from ARQ TX entity 106, at step 412). Accordingly, at step 418, the ARQ TX entity 106 considers ARQ blocks with a sequence number less than the sequence number in the ARQ reset acknowledgment message as positively acknowledged by the receiving device 104. Hence, the transmitting device 102 avoids re-transmission of the MAC Service Data Units (SDUs) transmitted in the positively acknowledged ARQ blocks.

Figure 5:
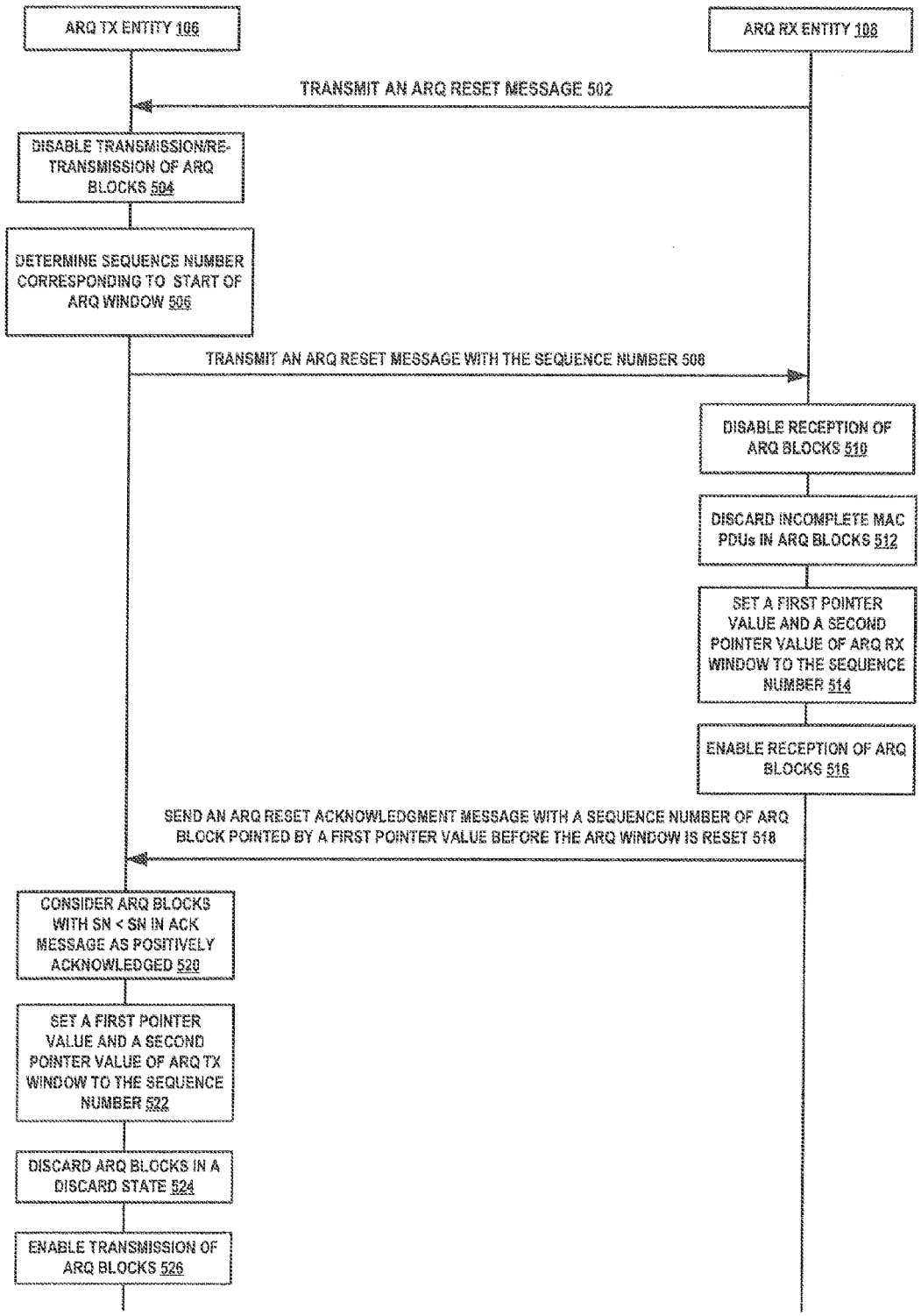
FIG. 5 is a flow diagram illustrating an exemplary method of performing an ARQ reset procedure in a wireless communication environment, according to further another exemplary embodiment of the present invention.

FIG. 5 is a flow diagram illustrating an exemplary method of performing an ARQ reset procedure in a wireless communication environment, according to further another exemplary embodiment of the present invention.

Referring to FIG. 5, an exemplary method is shown of performing an ARQ reset procedure initiated by the receiving device 104 and is similar to the ARQ reset procedure illustrated in FIG. 3, except for steps 518 and 520. Accordingly, a description of steps other than steps 518 and 520 is omitted herein for brevity.

At step 518, the ARQ RX entity 108 sends an ARQ reset acknowledgement message to the ARQ TX entity 106 indicating a sequence number of ARQ block pointed by a first pointer value of the ARQ window at the receiving device 104 prior to resetting the ARQ window (i.e., prior to setting the first pointer value and the second pointer value of the ARQ window to the sequence number received in the ARQ reset message from ARQ TX entity 106 at step 514). Accordingly, at step 520, the ARQ TX entity 106 considers ARQ blocks with a sequence number less than the sequence number in the ARQ reset acknowledgment message as positively acknowledged by the receiving device 104. Hence, the transmitting device 102 avoids re-transmission of the MAC SDUs transmitted in the positively acknowledged ARQ blocks.

Figure 6A:
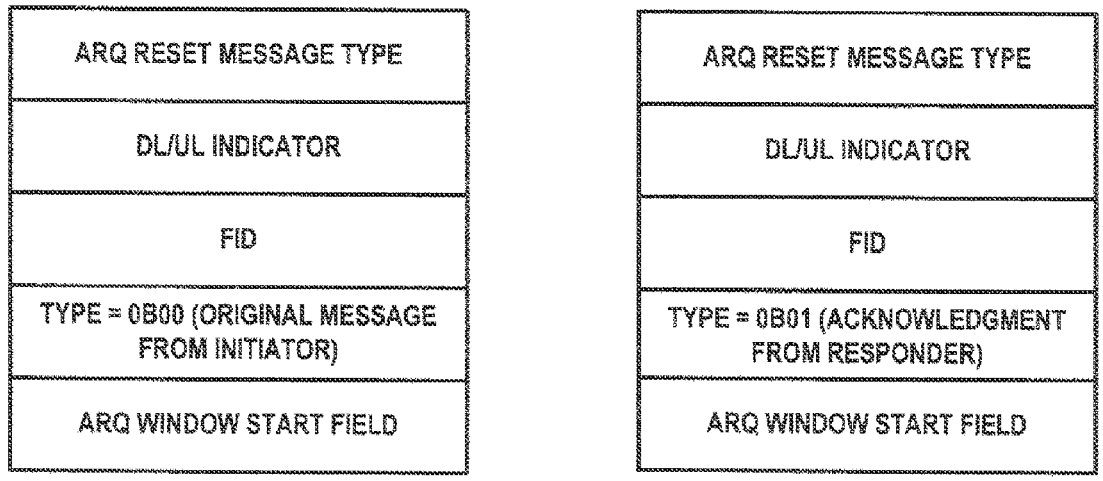
FIGS. 6A and 6B illustrate exemplary formats of ARQ reset messages and an ARQ reset acknowledgement message, according to an exemplary embodiment of the present invention.
Figure 6B:
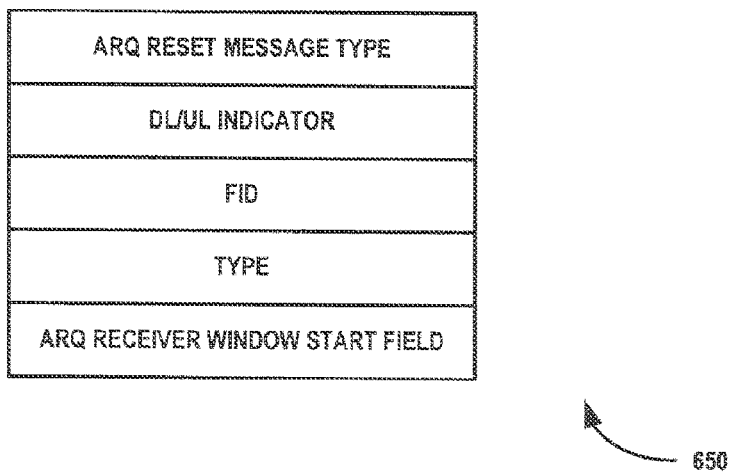

FIGS. 6A and 6B illustrate exemplary formats of ARQ reset messages and ARQ reset acknowledgement message, according to an exemplary embodiment of the present invention.

Referring to FIG. 6A, schematic representation 600 depicts a format of an ARQ reset message (e.g., the ARQ reset message transmitted in step 206 of FIG. 2) including determined sequence number transmitted to the receiving device 102 when the ARQ reset procedure is initiated by the transmitting device 102. The schematic representation 600 also illustrates another format of an ARQ reset message (e.g., the ARQ reset message transmitted in step 308 of FIG. 3) including a determined sequence number transmitted to the receiving device 104 when the ARQ reset procedure is initiated by the receiving device 104. It can be seen that, the ARQ reset messages include an additional 'ARQ window start' field indicating the determined sequence number for resetting the ARQ window.

Referring to FIG. 6B, the schematic representation 650 depicts a format of an ARQ reset acknowledgement message (e.g., the ARQ reset acknowledgement message transmitted in step 416) including a sequence number pointed by a first pointer value when the ARQ reset message is received at the receiving device 104. It can be seen that, the ARQ reset acknowledgement message includes an additional 'an ARQ receiver window start' field indicating a sequence number of an ARQ block corresponding to the start of ARQ window of the receiving device 104 when the ARQ reset message is received at the receiving device 104.

Figure 7:
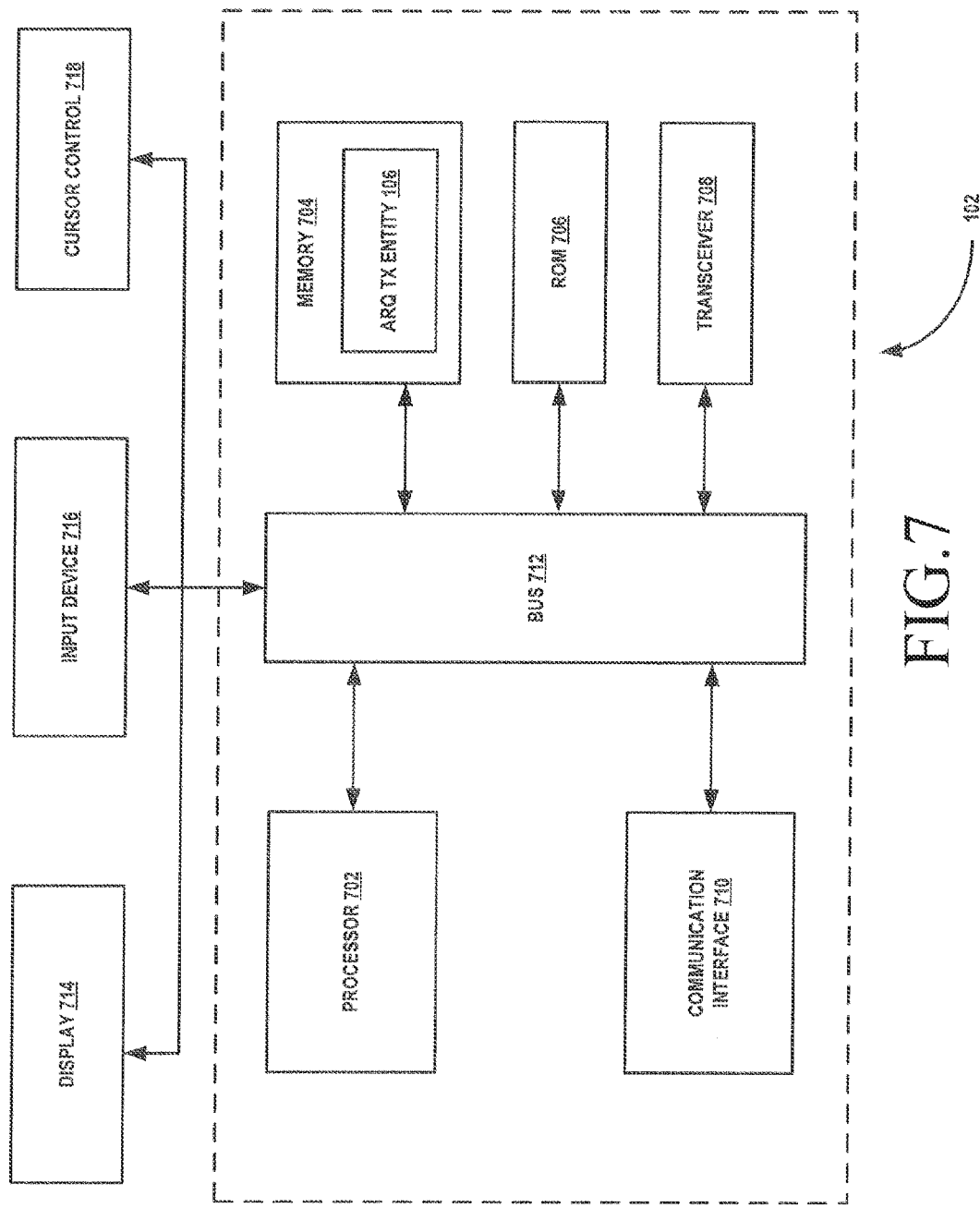
FIG. 7 is a block diagram of a transmitting device showing various components for implementing exemplary embodiments of the present invention.

FIG. 7 is a block diagram of the transmitting device 102 showing various components for implementing exemplary embodiments of the present subject matter.

Referring to FIG. 7, the transmitting device 102 includes a processor 702, memory 704, a Read Only Memory (ROM) 706, a transceiver 708, a communication interface 710, a bus 712, a display 714, an input device 716, and a cursor control 718.

The processor 702, as used herein, denotes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 and the ROM 706 may be volatile memory and non-volatile memory. The memory 704 includes the ARQ TX module 106 for performing one or more steps to reset an ARQ window (e.g., determining a sequence number corresponding to the start of ARQ window and setting the first pointer value and the second pointer value of the ARQ window to the determined sequence number), according to one or more exemplary embodiments described herein. A variety of non-transitory computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Exemplary embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 702. For example, a computer program may include machine-readable instructions capable of performing one or more steps to reset the ARQ window, according to the teachings and herein described exemplary embodiments of the present disclosure. In one exemplary embodiment, the program may be included on a Compact Disk-Read Only Memory (CD-ROM) and loaded from the CD-ROM to a hard drive in the non-volatile memory. The machine-readable instructions may cause the transmitting device 102 to encode according to the various exemplary embodiments of the present invention.

The transceiver 708 may be capable of transmitting the ARQ reset message including sequence number corresponding to the start of the ARQ window to the receiving device and receiving the ARQ reset acknowledgement message in response to the ARQ reset message. The bus 712 acts as an interconnect between various components of the transmitting device 102. The components such as communication interfaces 710, the display 714, the input device 716, and the cursor control 718 are well known to the person skilled in the art and hence an explanation thereof is omitted herein for brevity.

Figure 8:
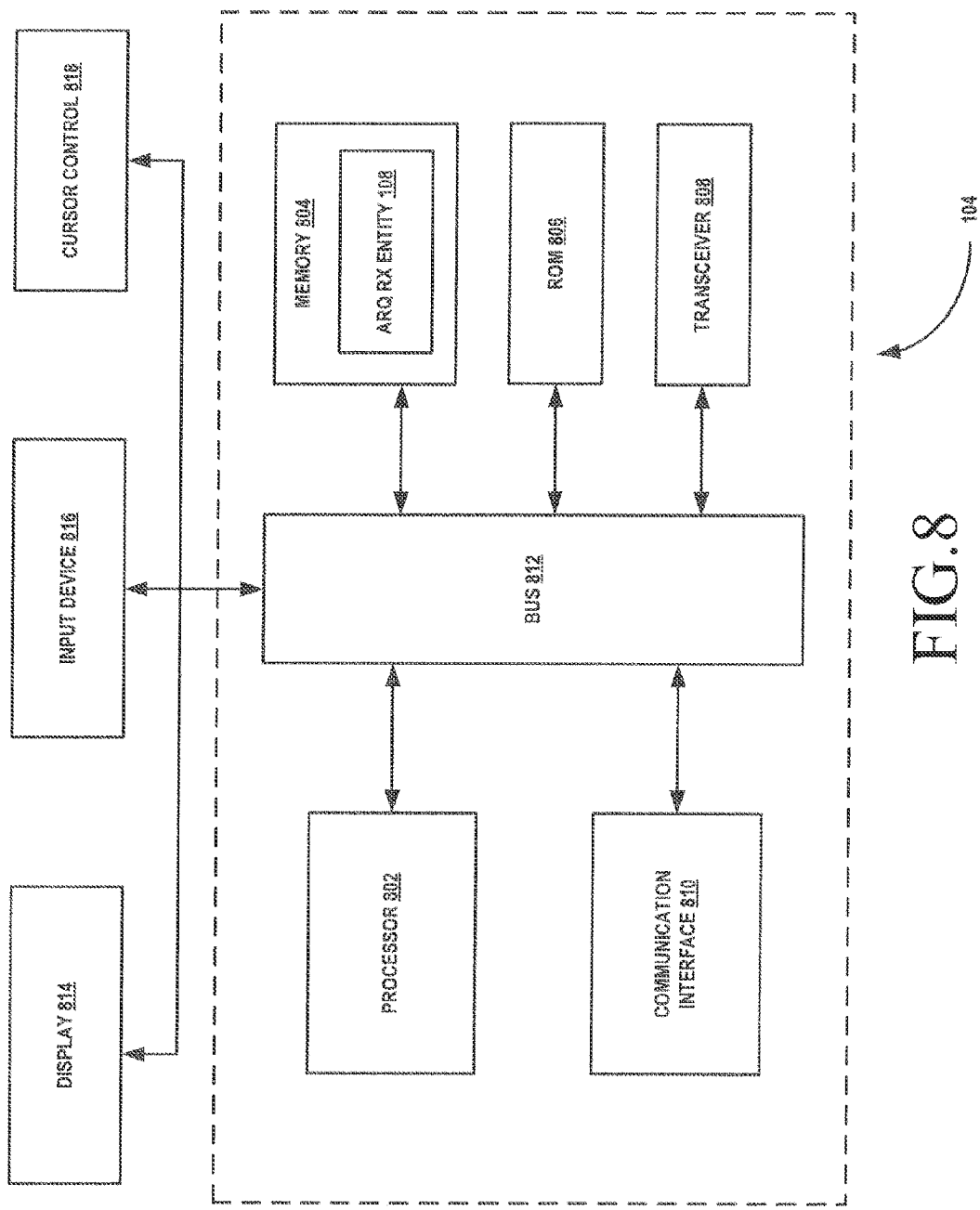
FIG. 8 is a block diagram of a receiving device showing various components for implementing exemplary embodiments of the present invention.

FIG. 8 is a block diagram of the receiving device 104 showing various components for implementing exemplary embodiments of the present subject matter.

Referring to FIG. 8, the receiving device 104 includes a processor 802, memory 804, a Read Only Memory (ROM) 806, a transceiver 808, a communication interface 810, a bus 812, a display 814, an input device 816, and a cursor control 818.

The processor 802, as used herein, denotes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, and the like.

The memory 804 and the ROM 806 may be volatile memory and non-volatile memory. The memory 804 includes the ARQ RX module 108 for performing one or more steps to reset an ARQ window (e.g., receiving an ARQ reset message including the determined sequence number and setting the first pointer value and the second pointer value of the ARQ window to the determined sequence number), according to one or more exemplary embodiments described above. A variety of non-transitory computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Exemplary embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 802. For example, a computer program may include machine-readable instructions capable of performing one or more steps to reset the ARQ window, according to the teachings and herein described exemplary embodiments of the present subject matter. In one exemplary embodiment, the program may be included on a CD-ROM and loaded from the CD-ROM to a hard drive in the non-volatile memory. The machine-readable instructions may cause the receiving device 104 to encode according to the various exemplary embodiments of the present subject matter.

The transceiver 808 may be capable of receiving the ARQ reset message including sequence number corresponding to the start of the ARQ window and transmitting the ARQ reset acknowledgement message to the transmitting device 102. The bus 812 acts as interconnect between various components of the receiving device 104. The components such as communication interfaces 810, the display 814, the input device 816, and the cursor control 818 are well known to the person skilled in the art and hence an explanation thereof is omitted herein for brevity.

The present exemplary embodiments have been described with reference to specific exemplary embodiments. It will be evident that various modifications and changes may be made to these exemplary embodiments without departing from the broader spirit and scope of the invention as defined by the appended claims and their equivalents. Furthermore, the various devices, modules, selectors, estimators, and the like described herein may be enabled and operated using hardware circuitry, for example, complementary metal oxide semiconductor based logic circuitry, firmware and/or software in combination with hardware, or firmware and/or software embodied in a machine readable medium. For example, the various electrical structure and methods may be embodied using transistors, logic gates, and electrical circuits, such as application specific integrated circuit.

The invention claimed is:

1. A method for performing an Automatic Repeat Request (ARQ) reset by a transmitting device in a wireless communication system, the method comprising:
   determining a sequence number indicating a start of an ARQ window, if an ARQ reset procedure is to be initiated;
   transmitting, to a receiving device, an ARQ reset message comprising the determined sequence number; and
   setting configuration information of the ARQ window at the transmitting device to the determined sequence number, wherein the sequence number indicating the start of the ARQ window is determined based on a sequence number of a lower edge of the ARQ window at the transmitting device, a size of the ARQ window, and an ARQ sequence number modulus (ARQ_SN_Modulus) indicating a number of unique sequence number values.

2. The method of claim 1, wherein the ARQ reset procedure is initiated by the transmitting device.

3. The method of claim 1, wherein the ARQ reset procedure is initiated by the receiving device.

4. The method of claim 3, further comprising:
   receiving, from the receiving device, an ARQ reset message representing an initiation of the ARQ reset procedure.

5. The method of claim 1, wherein the sequence number indicating the start of the ARQ window is determined based on the following equation:

$$\text{ARQ\_WINDOW\_START\_SN}_{ARQ\_RESET} = (\text{ARQ\_TX\_WINDOW\_START\_SN} + \text{ARQ\_WINDOW\_SIZE}) \bmod (\text{ARQ\_SN\_MODULUS}),$$

where $\text{ARQ\_WINDOW\_START\_SN}_{ARQ\_RESET}$ is the sequence number indicating the start of the ARQ window, ARQ_TX_WINDOW_START_SN is the sequence number of the lower edge of the ARQ window at the transmitting device, ARQ_WINDOW_SIZE is the size of the ARQ window, and ARQ_SN_MODULUS is the ARQ sequence number modulus.

6. The method of claim 1, wherein the configuration information of the ARQ window at the transmitting device comprises an ARQ_TX_WINDOW_START_SN indicating a sequence number of the lower edge of the ARQ window at the transmitting device, and an ARQ_TX_NEXT_SN indicating a lowest sequence number of the ARQ block which is to be transmitted next by the transmitting device.

7. The method of claim 1, further comprising:
   disabling transmission of new ARQ blocks and re-transmission of previously transmitted ARQ blocks by the transmitting device prior to determining the sequence number.

8. The method of claim 1, further comprising:
   enabling transmission of ARQ blocks after setting the configuration information of the ARQ window at the transmitting device to the determined sequence number.

9. The method of claim 1, further comprising:
   receiving an ARQ reset acknowledgement message from the receiving device in response to the ARQ reset message.

10. A transmitting device for performing an Automatic Repeat Request (ARQ) reset by a transmitting device in a wireless communication system, the transmitting device comprising:
    a communication interface configured to transmit and receive messages for an ARQ reset procedure to and from a receiving device;
    an ARQ entity configured to:
       determine a sequence number indicating a start of an ARQ window, if the ARQ reset procedure is to be initiated,
       transmit, to a receiving device, an ARQ reset message comprising the determined sequence number to a receiving device, and
       set configuration information of the ARQ window at the transmitting device to the determined sequence number; and
    a processor configured to control operations of the communication interface and the ARQ entity,
    wherein the sequence number indicating the start of the ARQ window is determined based on a sequence number of a lower edge of the ARQ window at the transmitting device, a size of the ARQ window, and an ARQ sequence number modulus (ARQ_SN_Modulus) indicating a number of unique sequence number values.

11. The transmitting device of claim 10, wherein the ARQ reset procedure is initiated by the transmitting device.

12. The transmitting device of claim 10, wherein the ARQ reset procedure is initiated by the receiving device.

13. The transmitting device of claim 12, wherein the ARQ entity is further configured to receive, from the receiving device, the ARQ reset message representing an initiation of the ARQ reset procedure prior to determining the sequence number.

14. The transmitting device of claim 10, wherein the sequence number indicating the start of the ARQ window is determined based on the following equation:

$$\text{ARQ\_WINDOW\_START\_SN}_{ARQ\_RESET} = (\text{ARQ\_TX\_WINDOW\_START\_SN} + \text{ARQ\_WINDOW\_SIZE}) \bmod (\text{ARQ\_SN\_MODULUS}),$$

where $\text{ARQ\_WINDOW\_START\_SN}_{ARQ\_RESET}$ is the sequence number indicating the start of the ARQ window, ARQ_TX_WINDOW_START_SN is the sequence number of the lower edge of the ARQ window at the transmitting device, ARQ_WINDOW_SIZE is the size of the ARQ window, and the ARQ_SN_MODULUS is the ARQ sequence number modulus.

15. The transmitting device of claim 10, wherein the configuration information of the ARQ window at the transmitting device comprises ARQ_TX_WINDOW_START_SN indicating a sequence number of the lower edge of the ARQ window at the transmitting device, and ARQ_TX_NEXT_SN indicating a lowest sequence number of the ARQ block which is to be transmitted next by the transmitting device.

16. The transmitting device of claim 10, wherein the ARQ entity is further configured to disable transmission of new ARQ blocks and re-transmission of previously transmitted ARQ blocks prior to determining the sequence number.

17. The transmitting device of claim 10, wherein the ARQ entity is further configured to enable transmission of ARQ blocks after setting the configuration information of the ARQ window at the transmitting device to the determined sequence number.

18. The transmitting device of claim 10, wherein the ARQ entity is further configured to receive an ARQ reset acknowledgement message from the receiving device in response to the ARQ reset message.

19. A method for performing an Automatic Repeat Request (ARQ) reset by a receiving device in a wireless communication system, the method comprising:
receiving, from a transmitting device, an ARQ reset message comprising a sequence number indicating a start of an ARQ window, if an ARQ reset procedure is to be initiated; and
setting configuration information of the ARQ window at the receiving device to the sequence number in the received ARQ reset message,
wherein the sequence number indicating the start of the ARQ window is determined based on a sequence number of a lower edge of the ARQ window at the transmitting device, a size of the ARQ window, and an ARQ sequence number modulus (ARQ_SN_Modulus) indicating a number of unique sequence number values.

20. The method of claim 19, wherein the ARQ reset procedure is initiated by the transmitting device.

21. The method of claim 19, wherein the ARQ reset procedure is initiated by the receiving device.

22. The method of claim 19, further comprising:
sending an ARQ reset acknowledgement message in response to the ARQ reset message upon setting the configuration information of the ARQ window at the receiving device to the sequence number received in the ARQ reset message.

23. The method of claim 19, wherein the sequence number indicating the start of the ARQ window is determined based on the following equation:

$$\text{ARQ\_WINDOW\_START\_SN}_{ARQ\_RESET} = (\text{ARQ\_TX\_WINDOW\_START\_SN} + \text{ARQ\_WINDOW\_SIZE}) \bmod (\text{ARQ\_SN\_MODULUS}),$$

where $\text{ARQ\_WINDOW\_START\_SN}_{ARQ\_RESET}$ is the sequence number indicating the start of the ARQ window, ARQ_TX_WINDOW_START_SN is the sequence number of the lower edge of the ARQ window at the transmitting device, ARQ_WINDOW_SIZE is the size of the ARQ window, and the ARQ_SN_MODULUS is the ARQ sequence number modulus.

24. The method of claim 19, wherein the configuration information of the ARQ window at the receiving device comprises ARQ_RX_WINDOW_START indicating a sequence number of a lower edge of an ARQ window at the receiving device, and ARQ RX NEXT BSN indicating a highest sequence number of the ARQ block which is received by the receiving device plus one.

25. The method of claim 19, further comprising:
disabling reception of one or more ARQ blocks upon receiving the ARQ reset message from the transmitting device.

26. The method of claim 19, further comprising:
disabling reception of one or more ARQ blocks, if an ARQ reset procedure is to be initiated.

27. The method of claim 19, further comprising:
enabling reception of ARQ blocks upon setting the configuration information of the ARQ window at the receiving device to the sequence number received in the ARQ reset message.

28. A receiving device for performing an Automatic Repeat Request (ARQ) reset in a wireless communication system, the receiving device comprising:
a communication interface configured to transmit and receive messages for an ARQ reset procedure to and from a transmitting device;
an ARQ entity configured to:
receive, from a transmitting device, an ARQ reset message comprising a sequence number indicating a start of an ARQ window, if the ARQ reset procedure is to be initiated, and
set configuration information of the ARQ window at the receiving device to the sequence number in the received ARQ reset message; and
a processor configured to control operations of the communication interface and the ARQ entity,
wherein the sequence number indicating the start of the ARQ window is determined based on a sequence number of a lower edge of the ARQ window at the transmitting device, a size of the ARQ window, and an ARQ sequence number modulus (ARQ_SN_Modulus) indicating a number of unique sequence number values.

29. The receiving device of claim 28, wherein the ARQ reset procedure is initiated by the transmitting device.

30. The receiving device of claim 28, wherein the ARQ reset procedure is initiated by the receiving device.

31. The receiving device of claim 28, wherein the ARQ entity is further configured to send an ARQ reset acknowledgement message in response to the ARQ reset message upon setting the configuration information of the ARQ window at the receiving device to the sequence number received in the ARQ reset message.

32. The receiving device of claim 28, wherein the sequence number indicating the start of the ARQ window is determined based on the following equation:

$$\text{ARQ\_WINDOW\_START\_SN}_{ARQ\_RESET} = (\text{ARQ\_TX\_WINDOW\_START\_SN} + \text{ARQ\_WINDOW\_SIZE}) \bmod (\text{ARQ\_SN\_MODULUS}),$$

where $\text{ARQ\_WINDOW\_START\_SN}_{ARQ\_RESET}$ is the sequence number indicating the start of the ARQ window, ARQ_TX_WINDOW_START_SN is a sequence number of the lower edge of the ARQ window at the transmitting device, ARQ_WINDOW_SIZE is the size of the ARQ window, and the ARQ_SN_MODULUS is an ARQ sequence number modulus.

33. The receiving device of claim 28, wherein the configuration information of the ARQ window at the receiving device comprises ARQ_RX_WINDOW_START indicating a sequence number of a lower edge of an ARQ window at the receiving device, and ARQ RX NEXT BSN indicating a highest sequence number of the ARQ block which is received by the receiving device plus one.

34. The receiving device of claim 28, wherein the ARQ entity is further configured to disable reception of one or more ARQ blocks upon receiving the ARQ reset message from the transmitting device.

35. The receiving device of claim 28, wherein the ARQ entity is further configured to disable reception of one or more ARQ blocks, if the ARQ reset procedure is to be initiated.

36. The device of claim 28, wherein the ARQ entity is further configured to enable reception of ARQ blocks upon setting the configuration information of the ARQ window at the receiving device to the sequence number received in the ARQ reset message.

* * * * *